Feb. 18, 1958 W. P. CHRISTOPH 2,824,292

HYDRAULIC POWER AMPLIFIER

Filed Feb. 29, 1956 2 Sheets-Sheet 1

INVENTOR
W. P. CHRISTOPH

ATTORNEYS

HYDRAULIC POWER AMPLIFIER

Filed Feb. 29, 1956 2 Sheets-Sheet 2

INVENTOR
W. P. CHRISTOPH

BY

G. J. O'Brien
W. O. Quesenberry
ATTORNEYS

United States Patent Office 2,824,292

Patented Feb. 18, 1958

2,824,292

HYDRAULIC POWER AMPLIFIER

Walter P. Christoph, Riverdale, Md., assignor to the United States of America as represented by the Secretary of the Navy Application February 29, 1956, Serial No. 568,685

8 Claims. (Cl. 340—13)

(Granted under Title 35, U. S. Code (1952), sec. 266)

The invention described herein may be manufactured and used by or for the Government of the United States of America for governmental purposes without the payment of any royalties thereon or therefor.

This invention relates to hydraulic power amplifier systems of a character adapted to convert audio frequency motion of a mass into hydro-acoustic pressure signals of a character suitable for detection by a pressure signal-to-electrical signal transducer after signal amplification by the hydraulic geophone and amplifier combination.

The invention is well adapted for use for hydraulic amplification of pressure signals in the audio and sub-audio frequency ranges down to and including static pressures or for the efficient conversion of sound velocity signals to pressure signals in the audio and sub-audio frequency ranges.

The invention further relates to a system for conversion of alternating input signals to amplified or amplified and rectified output signals by means of which the system will provide a desired linear or non-linear relationship between the input and output signals.

Certain of the principles of operation of the single ended amplifier of the instant invention have been incorporated in pneumatic amplifiers for signal recording and instrumentation apparatus but there are no known prior applications of the instant type of combined system to a low frequency hydraulic pressure system. The hydraulic power amplifier system generally incorporates a hydraulic power supply, a plurality of resistive and/or inductive inertance means such, for example, as capillaries and/or tubes, and/or capacitive means such as bellows or diaphragms, together with a hydraulic transducer of a character adapted to provide sensitivity to physical movements of a mass therein and thereafter convert such movement to pressure signals by changing the hydraulic impedance of the system according to the signals impressed at the input of the system.

The conversion of sound velocity signals may be advantageously applied in certain types of detection systems by virtue of the polar cosine receiving pattern provided by the instant system.

It has been observed experimentally that with a single ended amplifier embodiment of the instant invention certain feedback effects occur at the upper limits of frequency versus output pressure characteristics of the device and which produce resonant oscillations in the system. While this resonant condition may in certain instances be utilized to advantage in obtaining an increased output at this frequency, more frequently it is an undesirable condition which limits the useful frequency range of the system. This shortcoming of the single ended output type amplifier may be overcome to a great extent by the use of the new and novel push-pull hydraulic circuit arrangement of the preferred embodiment of the instant invention and in a manner to be hereinafter described in greater detail.

The single-ended amplifier circuitry may be considered as essentially a series hydraulic circuit with one side of the input grounded. It comprises a fixed hydraulic resistance, a constant pressure hydraulic power supply and a variable fluid resistance, the variation of which is controlled by the input acoustic signal. Fluid supplied from the source at a given pressure flows through the variable and fixed hydraulic resistors causing predetermined pressure drops therein. The variable resistor of the instant system is comprised basically of a truncated conical nozzle in close proximity to a slightly prebent band or reed and spaced a predetermined distance therefrom. The fluid flow is controlled by two areas, viz., the nozzle mouth opening, and the ring gap between the nozzle and the reed which is formed at the circumference of the nozzle mouth.

The total resistance value of the nozzle diaphragm assembly is a combination sum of the value of the mouth resistance and the hydraulic resistance of the ring gap. It is to be understood however that the absolute resistance which is provided with the close proximity conditions of the instant situation as in the case of a nozzle discharging against a reed or band are not algebraically addable since the flow pattern of one controls the resistance of the other. Assuming a condition wherein a sufficient total force is available from the sound signal to operate a mechanical booster it becomes possible to increase the displacement of the reed at the nozzle outlet and provide a geometrically amplified output. Since the displacement at the sound source will be very small, it is necessary to use a reed mounting with no play therein. The instant invention utilizes a slightly prebent band or reed which is buckled by a force applied axially to it, one end thereof being fixed. It will thus be apparent as the description proceeds that a slight axial movement of the band will produce a comparatively large change in its buckled height. The nozzle mouth then can be placed adjacent to and substantially parallel to the band at the midpoint thereof. In order to achieve the greatest efficiency it has been determined that the mid-section of the band should be planar. It has been determined that in the apparatus of the instant invention there are two basic adjustments to be made initially and which require special attention; i. e., the nozzle band distance, and the band curvature. The structure for accomplishing the adjustments will become more clearly apparent as the description proceeds. It has been determined that the arrangement wherein the band displacement is multiplied by a single multiplier offers several essential advantages. One such advantage resides in the fact that it permits usage of a greater ring depth opening and particularly in an arrangement wherein a diaphragm presented to the signal source functions to directly drive a geometrical multiplier in spaced adjacency to the nozzle arrangement. The instant arrangement provides a low hydraulic impedance which is desirable because the hydraulic detector preferably used with this invention is essentially a flow meter of the electrolytic detector type described in my copending application, Serial No. 568,683, filed February 29, 1956, and in that reasonable flow rates are required for operation of such a flow meter. There is also an advantage in that the operational and manufacturing requirements stay wtihin reasonably achieved limits. Also the system presents advantage in that the band nozzle distance will offer less operating trouble due to microscopic particles in the fluid. Temperature compensation also may be achieved by utilizing materials having very close coefficients of expansion. It has also been determined experimentally that the nozzle edges need not necessarily be knife edged if in the case of the flat top nozzles the wall thickness is in the order of 0.005". This is an important feature in that it provides for a much simpler nozzle fabrication and less criticality of the planar tolerances in the distance from the nozzle mouth to the band. Also the coaxiality problems with respect to the conical outer surface and the nozzle hole are drastically reduced.

The preferred aspect ratio of this length to the nozzle-counter plate spacing is in the order of 10:1 to 30:1. The reed which functions to modulate the flow of supply fluid under pressure is well adapted for coupling to a mechanical displacement amplifier working on a geometric magnification principle. The band utilized in this device is adapted to be actuated from one end and its transverse central vibrations are a geometric magnification of the input vibration. This magnified displacement therefor controls the variable resistance hydraulic element thereof.

It is a feature of the instant invention to provide for both a single ended amplifier and a double ended or push-pull type of amplifier.

One object of this invention resides in the provision of means including a hydraulic amplifier for detection of low frequency hydro-acoustic pressure signal intelligence.

Another object resides in the provision of a system for hydraulically amplifying acoustic pressure signal intelligence prior to transduction of said intelligence into electrical signal intelligence.

A further object of this invention resides in the provision of a push-pull hydraulic amplifier for underwater acoustic signal intelligence.

It is also an object to efficiently combine a hydraulic amplifier and a low frequency electrolytic detector for improved frequency response characteristics over underwater acoustic signal detection devices and systems heretofore or now in general use.

Another object is to improved sensitivity of electrolytic flow detectors to low frequency underwater acoustic pressure signals down to static head pressure change intelligence by driving said flow detector by pressure changes in the output circuit of a hydraulic amplifier which incorporates an acoustic mechanical transducer for modulation of a variable hydraulic impedance disposed in the control portion of said hydraulic amplifier circuit.

Another object resides in the provision of a new and novel hydro-acoustic amplifier and detector system for substantially overcoming the shortcoming of low frequency insensitivity of prior art underwater sound pressure detection systems while providing substantially all of the advantages thereof.

Other objects and many of the attendant advantages of this invention will be readily appreciated as the same becomes better understood by reference to the following detailed description when considered in connection with the accompanying drawings wherein.

Figure 1:
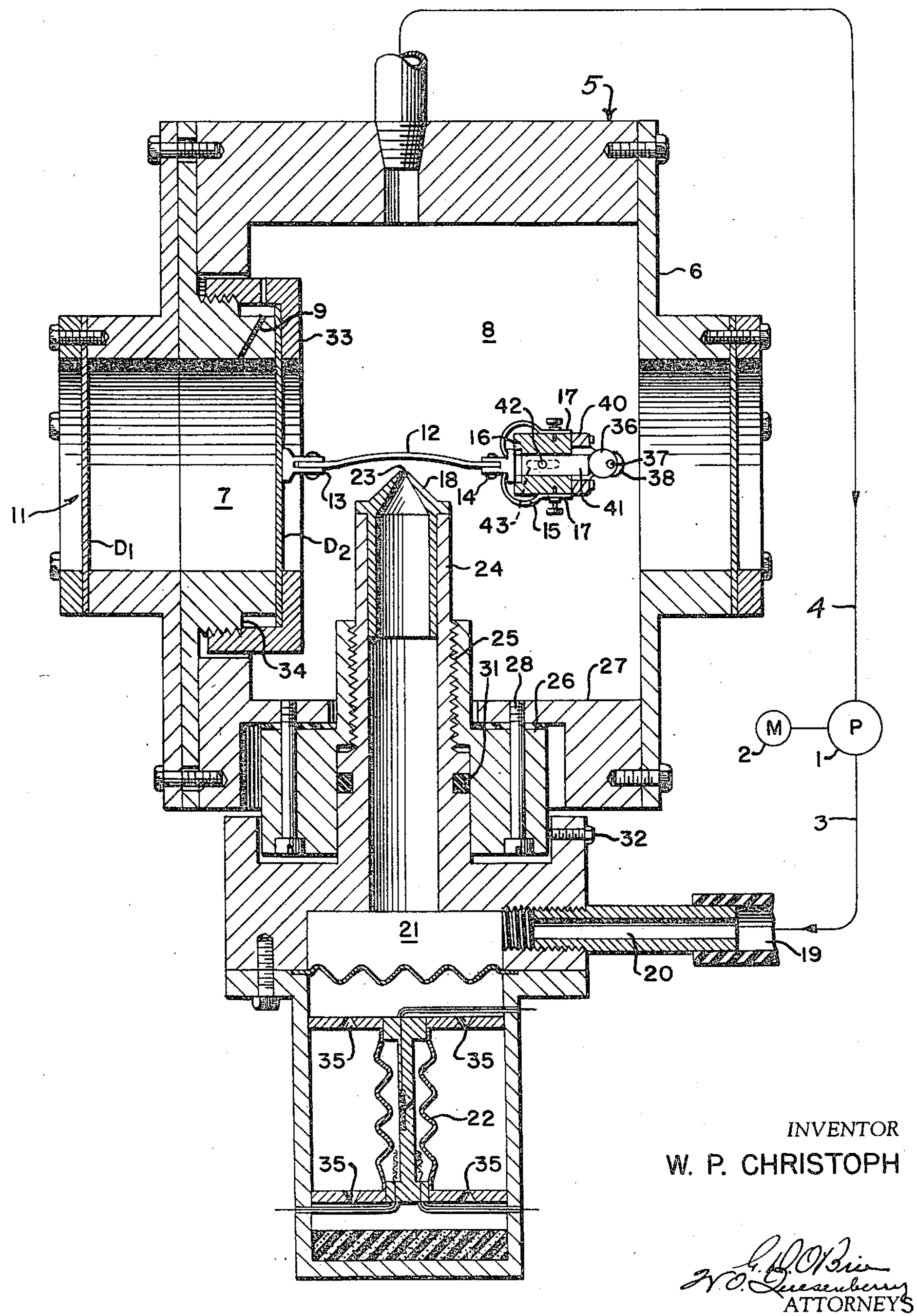
Fig. 1 is a generally diagrammatic illustration of a single ended hydraulic amplifier circuit of one embodiment of the instant invention.

Referring now to the generally diagrammatic illustration of the amplifier arrangement of Fig. 1, the system comprises a pump 1 driven by a suitable motor 2 to provide a source of constant pressure for the system and thereby cause water or any other suitable hydraulic fluid to flow through the closed hydraulic system. The pump is connected by suitable conduits 3 and 4 for fluid flow to and from the main housing portion 5 of the amplifier generally indicated at 6.

Figures 2, 3:
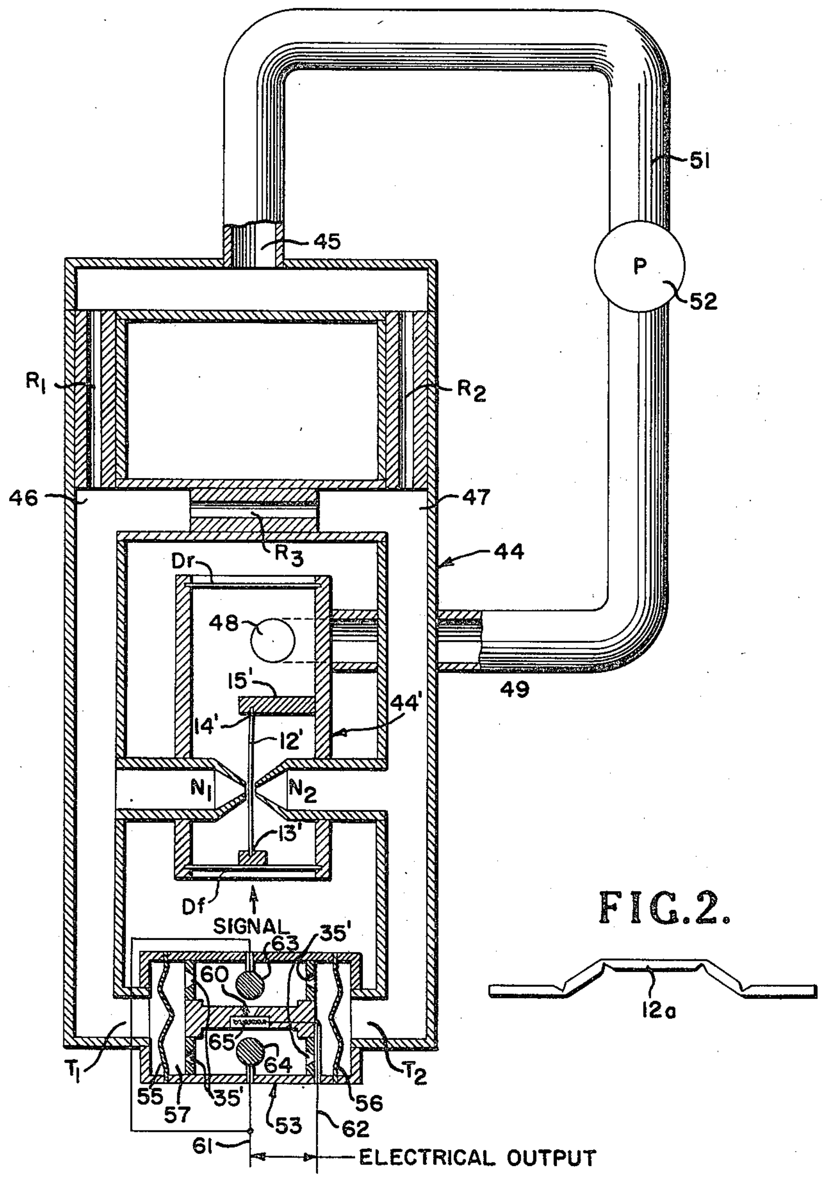
Fig. 2 is a view in elevation of a prebent band or reed which differs somewhat from that shown on Fig. 1.
Fig. 3 is a generally diagrammatic illustration of a push-pull or double ended amplifier of a second and preferred embodiment of the instant invention.

The amplifier 5 and assembly 6 comprises a plurality of diaphragms designated as $D_1$, $D_2$ which enclose a coupling chamber 7. This chamber 7 is interconnected with the main chamber 8 by means of a fixed and frequency independent hydraulic resistance passage 9 for equalizing the static pressures between the two chambers 7 and 8. The hydraulic transducer portion of the apparatus and indicated generally at 8 includes the input diaphragm $D_1$ for reception of the sound signal at 11. This signal is coupled through the fluid of chamber 7 to diaphragm $D_2$ in a manner to drive the preformed reed or band 12 which is fixed at the end 13 thereof to the diaphragm $D_2$ and is adjustably restrained at the opposite end 14 thereof by suitable springs 15. The mounting 16 which carries springs 15 may be of any character providing for a suitable alignment and adjustment of the position of the band or reed 12 with respect to the nozzle 18 which is disposed to discharge against the band and is in close spaced adjacency thereto. Preferably the band 12 is slightly prebent into a trapezoidal section as illustrated in Fig. 2 or precurved as shown in Fig. 1. After the alignment of the band in a preferred orientation with respect to the nozzle it is suitably locked against lateral movement by means of a pair of lock screws on each of the sliding pins at 17 on the mount 16 for the restrained end 14 of the band 12.

Disposed within the inlet 19 to the housing 6, there is provided a hydraulic inductance tube 20 of less diameter than the inlet 19. In adjacency to the tube 20 and ahead of the discharge nozzle 16 there is provided a chamber 21 which is adapted for reception of a piezoelectric or electrolytic pressure sensitive device generally indicated at 22 for measurement of the flow changes in the fluid conduits 3 and 4 thereby circulating the output circuit of the system.

The system functions in a manner wherein a sound signal is initially impressed on the outer diaphragm $D_1$ and coupled by the fluid of chamber 7 to the diaphragm $D_2$ which provides a movement of the flexible band or reed 12 by movement of connection 13 therewith and varies the instantaneous hydraulic resistance of the output circuit by permitting a greater or lesser discharge flow from the orifice 23 of nozzle 18. This change of flow provides an output which is correlative to and in phase with the sound signal applied to diaphragm $D_1$. This amplified audio frequency signal provides an output of sufficient amplitude for detection by the electrolytic detector cell or the like disposed at 22. The nozzle 18 is fixedly mounted in the nozzle holder 24 which is secured by means of a fine thread at 25 into the flange member 26. This flange member 26 is rigidly attached to the base 27 of the housing 6 by means of machine bolts 28 or any other suitable means. The nozzle holder 24 and the flange member 26 have a close sliding cylindrical fit at the bore 29 between which a seal is provided by virtue of the gasket or O-ring disposed at 31. One or several set screws 32 may be provided to fix the adjusted position of the nozzle holder 24 and prevent subsequent rotation from the adjusted position thereof with respect to the member 26 and base 27. The purpose of the fine thread at 25 is to provide an adjustment means whereby the distance from the nozzle exit to the band may be set to an optimum value as determined by the desired frequency response characteristics of the systems and correlative with the predetermined flexibility characteristics of the band.

The band mounts at 13 and 14 are such as to provide a central and perpendicular positioning of the band 12 with respect to the diaphragm. Its construction is of a character to provide a non-distorting band mounting. The band is preferably slightly prebent as aforementioned and this may be accomplished either by preforming prior to assembly or by flexure introduced by the mounting structure by virtue of the position of the cam adjustment 36 which is thereafter locked by a lock screw not shown provided on the threaded shaft 37 for the adjusting knob at 38. The discharge distance between the nozzle mouth and the band 12 must be below one quarter of the nozzle diameter. It has been determined experimentally that the best results are obtained by making this distance in the order of .001" at a nozzle mouth diameter of .040". The geometrical dimensions of the band and the diaphragm $D_2$ depend in their design on the prevailing conditions and the particular application of the device. The band stiffness and adjusted preloading by cam 36 must however be of low enough value not to distort the diaphragm $D_2$. The band 12 and the diaphragm $D_2$ are preferably made from the same material as the band holder 16 and the diaphragm mounting ring 33 which is attached in any suitable manner as for example by threaded engagement with flange assembly 34. If, however, materials of different coefficients of expansion are required to be used, the band holder may be made completely or partly of such a material as is suitable to compensate for permanent displacements of the band with respect to the nozzle mouth 23 due to temperature changes.

While a flow detector utilizing a full wave hydraulic bridge rectifier circuit has been shown diagrammatically with an electrolytic detector cell at 22, it is to be understood that other types of flow detectors may be utilized in certain instances. Also a ceramic crystal hydrophone may be utilized in the bridge circuit or rectifiers 35 or separately, although it is preferable to use an electrolytic detector with a hydraulic rectifying bridge of the general character shown. Other modifications may be made with respect of the bridge circuit and particularly as shown and described in the copending application of Walter P. Christoph, Serial No. 568,683, filed February 29, 1956.

In the event a rectifying bridge detector is utilized, a hydraulic inductance tube is provided at 20 to prevent short circuiting of the A.-C. signals through the direct current flow path through the nozzle 18 and back to the pump 1.

The structure for adjusting and prebending of the band 12 is shown by way of example to include an eccentric cam 36 carried on shaft 37 in mounting 40 and adjusted by means of a knob at 38. The cam 36 engages the outer end of shaft 41 to position the shaft against the tension of the spring 15. After the adjustments have been made the assembly is locked by a pair of knobs, not shown, which clamp the shaft 41 against lateral movement in the transverse bore therefor, while being slidably retained in a manner permitting longitudinal sliding movement of the pin 42 in the slots shown in dashed outline at 43. An alternate geometric configuration of the band is shown in Fig. 2. This alternate band 12*a* may likewise be used with the aforedescribed adjusting and band mounting arrangements.

The mechanical properties of the detector diaphragms and the mass of fluid enclosed by the diaphragms $D_1$ and $D_2$ must be chosen according to the functional requirements of the specific application.

Referring now to the diagrammatic showing of Fig. 3, there is shown a hydraulic circuit network for a push-pull hydraulic amplifier generally indicated at 44 wherein the inlet at 45 is shown for a suitable fluid which enters the system with a predetermined hydrostatic pressure head. The circuit is divided into two branches 46 and 47 and fluid passes through the hydraulic resistances and/or inductances indicated generally as tubes or passages at R1 and R2. The downstream ends of these resistances are connected to the opposite ends of the load resistance R3. The two branches 46 and 47 lead to the nozzles $N_1$ and $N_2$ which are disposed on opposite sides of and in closely spaced adjacency to the band element 12′. The band 12′ which is located, as shown on Fig. 3, is mounted with one end connected to the front diaphragm $D_f$ at 13′ and the remote end thereof adjustably attached to the supporting portion 14′ of the mounting bracket 15′ of the cylindrical portion 44′ of the housing 44. The housing portion 44 is closed by the rear diaphragm indicated at $D_r$. The hydraulic fluid in the system as discharged from the two nozzles $N_1$ and $N_2$ leaves the amplifier apparatus through the outlet 48 and is connected by the conduit 49 into a closed circuit through the pump 52 with the inlet conduit 51. The output pressure difference is measured across the points $T_1$ and $T_2$ by means of a suitable pressure gauge disposed in the output circuit at 53.

This pressure measuring system at 53 is also of the electrolytic detector variety and is preferably connected in a rectifying bridge circuit of the character shown diagrammatically to include the rectifiers 35′ and a pair of diaphragms 55 and 56 for enclosing the electrolyte at 57. In the embodiment of Fig. 3 the inner diaphragms for enclosing the detector cell per se as shown in Fig. 1 may be dispensed with and the electrolyte fluid be permitted to circulate through the rectifying orifices in a direction to provide a unidirectional flow through the cathode orifice 60 under carrying signal intelligence conditions. The electrical output is obtained across the leads 61 and 62 for the electrodes 63, 64 and cathode 65.

The operation of the push-pull hydraulic amplifier of Fig. 3 is generally similar to that of the single ended amplifier of Fig. 1, with the exception that two nozzles $N_1$ and $N_2$ are disposed in adjacency to the band 12′. The band or reed 12′ is driven by the front diaphragm $D_f$ shown as directly driven by sound pressure signals but which may likewise be driven through a coupling chamber having a high frequency by-pass filter orifice as shown on Fig. 1. As aforementioned, the fluid flowing in the closed hydraulic circuit of pump 52 is divided into two flow paths which include the impedance or hydraulic inertance elements R1 and R2.

The pressure differential between the two flow paths, as they discharge through the nozzles $N_1$ and $N_2$ with different positions of the reed which is undergoing movement due to the application of a signal pressure at the diaphragm $D_f$, appear across the load impedance R3. This pressure differential is indicated by a suitable hydroacoustic pressure detector and transducer at 53, the electrical output at 61, 62 of which may be applied to any suitable utilization circuit or indicating device not shown.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A hydraulic power amplifier of the character disclosed comprising a housing providing a pair of fluid filled chambers, one of said chambers being of generally cylindrical configuration, a pair of compliant closure members disposed to substantially close the opposite ends of said cylindrical chamber, an inlet and outlet to the other of said chambers, fluid nozzle means in fluid communication with said inlet, a source of fluid under pressure for application to said nozzle means and connected in a closed hydraulic circuit relation with said outlet, a thin flexible band connected at one end to one of said compliant closure members for flexural movement therewith and disposed with the mid portion thereof in close spaced adjacency to and transversely of said nozzle, the other end of said band being resiliently mounted to said housing, and detector means disposed in said circuit in a manner to measure changes in fluid pressures with flow in said closed hydraulic circuit and provide an amplified output correlative to the movement of said band with respect to said nozzle means under sound pressure signal applications to one of the diaphragms of said cylindrical chamber.

2. The structure of claim 1 wherein said nozzle means comprises a single nozzle disposed in fluid communication with said detector, and wherein said detector comprises an electrolytic detecting cell.

3. The structure of claim 2 further characterized by the inclusion of said electrolytic detector in a hydraulic rectifying circuit comprising a plurality of hydraulic asymmetrically conducting elements disposed in a full wave bridge relationship.

4. The structure of claim 1 wherein said nozzle means comprises a plurality of nozzle orifice elements disposed in a push-pull hydraulic circuit relationship, a hydraulic impedance load element connected in shunt with said nozzle and said detector and wherein said detector is a pressure differential indicating device.

5. The structure of claim 4 further characterized by the inclusion of a pair of hydraulic impedance elements in said closed hydraulic circuit with one each disposed respectively in a manner to provide separate flow paths between said inlet and each of said nozzle orifice elements.

6. A push-pull hydraulic power amplifier circuit comprising a source of fluid under pressure, a pair of fluid nozzles disposed in a circuit relationship to provide a pair of separate flow paths from said fluid pressure source, said circuit being a common return path for said nozzles to said pressure source, a flexible band disposed for movement across the discharge paths of both of said nozzles, compliant means disposed to be subjected to an ambient external source for acoustic pressure signal intelligence, said band being connected to said compliant means in a manner to be driven thereby in response to signal pressure changes and for modulating the discharge flow from said nozzles, load means for said circuit and detecting means for providing an output correlative to the amplified pressure differential across said load means.

7. The structure according to claim 6 further characterized by the inclusion of a full wave hydraulic rectifying circuit connected in a full wave bridge configuration for presenting a rectified signal envelope to said detector, said detector being further characterized by the inclusion of an electrolytic detecting cell for providing a transduction of said acoustic pressure differential signals into electrical signal energy.

8. A hydraulic power amplifier system of the character disclosed for providing power multiplication into electrical signal energy by a pressure signal to electrical signal transducer, which comprises a closed hydraulic circuit including a hydraulic pump means and a chamber portion, a series connected hydraulic inertance means as a hydro-acoustic signal load, means in said circuit for modulating the flow of fluid in response to hydro-acoustic sound pressure variations presented as an input to said system, said means comprising elements providing a fluid filled chamber, with a pair of diaphragms disposed at opposite ends thereof, a high frequency by-pass means connected in fluid communication between the interior of said chamber and the flow path of said closed hydraulic circuit, the first of said diaphragms being disposed for actuation by an ambient underwater sound pressure field and for coupling sound signal intelligence or static pressure changes to the fluid in said enclosed chamber, said enclosed fluid being contained in a manner to transmit said signals therethrough to said second diaphragm, said second diaphragm carrying one end of a thin flexible reed-like band for movement in response to movement of said second diaphragm, the end of said band remote from said diaphragm being adjustably and resiliently fixed, a fluid nozzle disposed to discharge fluid of said closed circuit against said band, said band being disposed in closely spaced adjacency to said fluid nozzle for modulation of the flow therefrom in response to signal variations applied thereto by said second diaphragm, and means hydraulically coupled with said closed circuit flow path for providing detection and electrical transduction of changes in the hydraulic impedance of said flow path as said band is moved to vary the spacing with respect to said nozzle discharge flow, said modulating band being enclosed in said chamber portion of said closed circuit having means providing a hydraulic capacitance in series with said hydraulic impedance.

References Cited in the file of this patent

UNITED STATES PATENTS

| | | |
|---|---|---|
| 1,738,988 | De Forest | Dec. 10, 1929 |
| 2,454,496 | Ashton | Nov. 23, 1948 |
| 2,661,430 | Hardway | Dec. 1, 1953 |
| 2,769,929 | Hardway | Nov. 6, 1956 |

FOREIGN PATENTS

| | | |
|---|---|---|
| 730,965 | Great Britain | June 1, 1955 |